L. G. RUDE.
BEEFSTEAK ROLLER.
APPLICATION FILED OCT. 13, 1914.
1,129,232.
Patented Feb. 23, 1915.
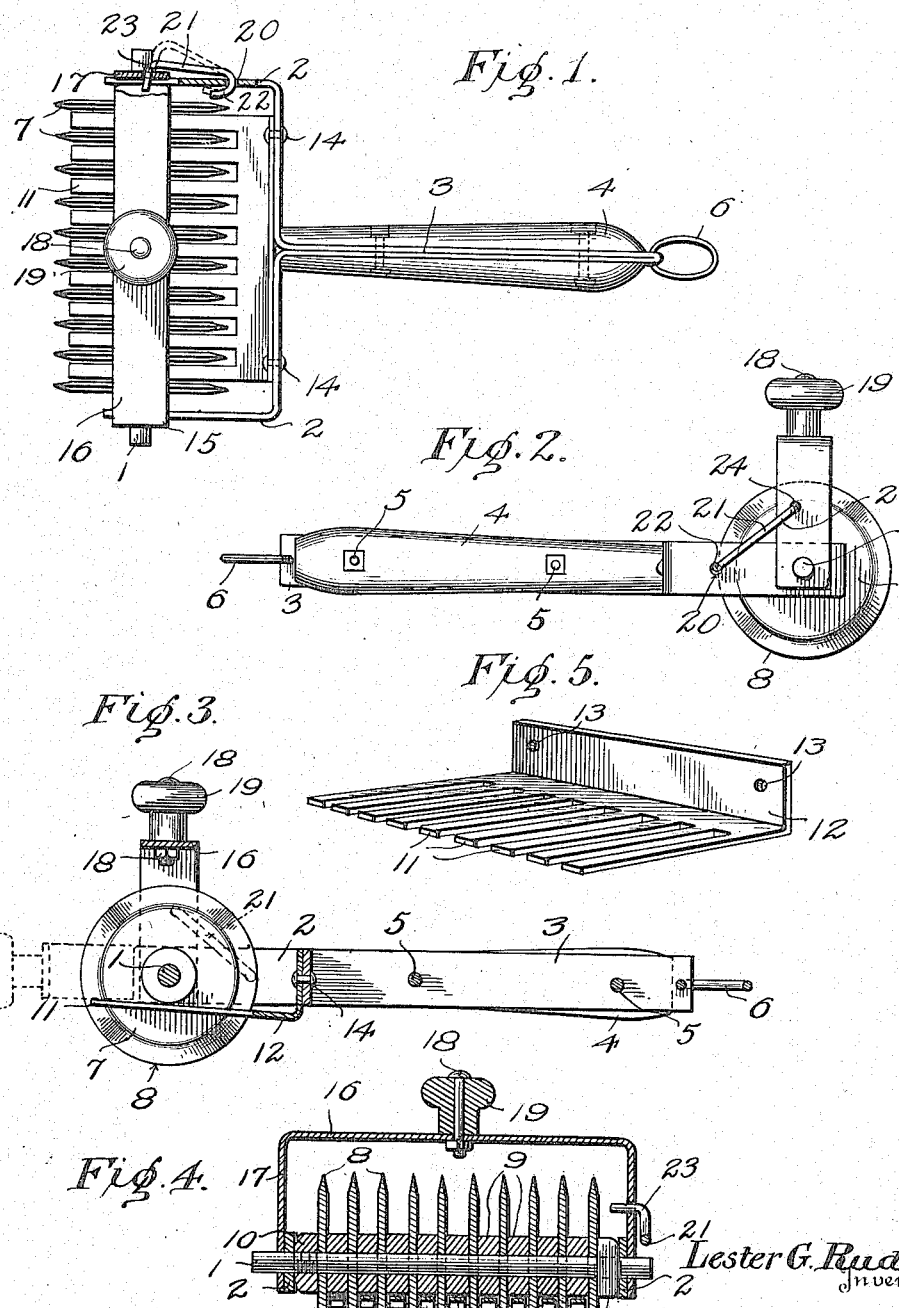
Lester G. Rude, Inventor

UNITED STATES PATENT OFFICE.

LESTER G. RUDE, OF BARNESVILLE, MINNESOTA, ASSIGNOR OF ONE-HALF TO
T. GUNNESS, OF BARNESVILLE, MINNESOTA.

BEEFSTEAK-ROLLER.

1,129,232.  Specification of Letters Patent.  Patented Feb. 23, 1915.

Application filed October 13, 1914. Serial No. 866,498.

*To all whom it may concern:*

Be it known that I, LESTER G. RUDE, a citizen of the United States of America, residing at Barnesville, in the county of Clay and State of Minnesota, have invented certain new and useful Improvements in Beefsteak-Rollers, of which the following is a specification, reference being had therein to the accompanying drawing.

This invention relates to meat tenderers and has special reference to a beef steak roller having a plurality of rotary cutting disks which are adapted to be so carried so as to allow the same to be easily moved over a piece of steak, therefore, easily and efficiently cutting the steak for making the same tender.

Another object of this invention is the production of a beef steak roller having a plurality of rotary cutting disks which are adapted to be free from pieces of meat or like substances by means of the simple and efficient cleaning fingers extending therebetween.

Another object of this invention is the production of a frame carried by the shaft of the device which is pivotally mounted so as to allow pressure to be brought to bear upon the shaft and which is adapted to be releasably held in a set position by means of a simple and efficient spring catch.

With these and other objects in view this invention consists of certain novel combinations, constructions, and arrangements of parts as will be hereinafter fully described and claimed.

In the accompanying drawing:—Figure 1 is a top plan view of the beef steak roller. Fig. 2 is a side elevation of the device. Fig. 3 is a central longitudinal section through the same. Fig. 4 is a central transverse section taken through the forward end of the device. Fig. 5 is a detail perspective view of the cleaning fingers and supporting body therefor.

Referring to the accompanying drawing by numerals 1 designates the shaft which supports the U-shaped yoke 2. This yoke 2 is formed of a single strip of material and has its body portion 3 being bent so as to form two side portions which are bent so as to be integrally connected at one end. The handle 4 comprises a pair of sections which fit upon each side of the body 3 of the yoke 2, and through the handle 4 and body 3 there is passed a pair of retaining bolts 5 for fixedly securing the handle 4 in position. It is obvious that the outer or free end of the body 3 may carry a ring 6 for allowing the device to be easily carried or hung upon a support. The shaft 1 is adapted to carry a plurality of cutting disks 7 which are loosely and rotatably mounted upon the shaft 1, and which are provided with cutting edges 8. These disks 7 are held in proper spaced relation by means of the collars 9 which are carried by the shaft 1, and are interposed between the disks 7. For the purpose of retaining these disks and collars in firm engagement with each other, lock nuts 10 may be threaded into engagement with the shaft 1 so as to bear upon the outer faces of the outer disk as clearly shown in Fig. 4. The yoke 2 is then positioned upon the shaft 1 so as to allow the ends of the shaft to pass for a considerable distance beyond the side faces of the yoke. It will be seen that by grasping the handle 4 and placing the disk upon a piece of steak, the device may be easily moved back and forth upon the steak, thereby allowing the disk to freely rotate for cutting and tendering the meat.

In order to prevent small portions of the meat from clinging to the disks 7 there is provided a plurality of spaced fingers 11 formed upon the L-shaped bar 12. This bar 12 is provided with apertures 13 through which the rivets 14 may be passed for fixedly securing the cleaner in engagement with the yoke 2. By referring particularly to Figs. 1 and 3 it will be seen that the rivets 14 engage the bar 12 and yoke 2. Since these fingers are formed in parallel spaced relation they may be passed between the disks 7 as shown in Figs. 1 and 4, whereby the disks will be efficiently cleaned and at the same time be allowed to freely rotate.

The frame 15 is carried by the shaft 1, and this frame 15 is formed to constitute a bridge 16 having depending ends 17. These ends 17 are carried by the shaft 1 adjacent its end portions as clearly shown in Fig. 4. The bridge 16 is provided adjacent its central portion with a bolt 18 carrying a gripping knob 19, whereby pressure may be imparted by means of the frame 15 to the shaft 1. By imparting pressure to this shaft, the disks 7 will be caused to cut very deeply into the piece of meat over which the device is being drawn. It is very desirable to provide the device with a simple and efficient means for retaining the frame 15 in a vertical position so as to allow the pressure imparted by the knob 19 and bridge 16 to be brought to bear directly upon the shaft 1. In order to accomplish this function, the frame 2 is provided with an opening 20 as clearly shown in Figs. 1 and 2, and through this opening the spring catch 21 is adapted to extend. This spring catch 21 is provided with a hook portion 22 adjacent one end and with an annular bent finger 23 at its opposite end. The hook 22 is adapted to pass through the opening 20 as shown in Fig. 1, while the finger 23 is adapted to pass through an opening 24 formed in one of the depending ends 17 of the frame 15. When this spring catch is in position it will be seen that the frame 15 will be efficiently retained in a set position and, therefore, will prevent the frame from accidentally springing downwardly.

By referring particularly to Fig. 1 it will be seen that in order to allow the frame 15 to be swung downwardly the spring catch 21 may be pulled outwardly as disclosed in dotted lines at which time the finger 23 will be moved from the opening 24. At this time the end of the hook 22 will be bearing upon the yoke 2, thereby urging the spring catch 21 toward the outer side of the yoke 2. As soon as the frame 15 has been released it may be swung downwardly, and the spring catch may then be released so as to swing inwardly. Whenever the frame 15 is held in its vertical position, it will be seen that the spring catch will be held against accidental movement, since the hook 22 will engage the inner portion of the yoke 2, and the catch 21 will retain the finger 23 within the opening 24.

It is obvious that if so desired the frame 15 may be lowered when it is not desired to use the same, or the device may be used for cutting cabbage or like vegetables when it is desired to cut the same into fine particles.

From the foregoing description it will be seen that an efficient meat tenderer has been produced wherein the disks may efficiently cut and tender a piece of meat, and which may be easily freed from small particles of meat by means of a plurality of spaced fingers. Furthermore, it may be noted that pressure may be brought to bear upon the device by means of the pivotal supported frame, which frame is normally retained in its vertical position by means of a resilient spring catch.

Having thus described the invention what is claimed as new, is:—

1. A device of the class described comprising a shaft, a U-shaped yoke carried by said shaft, said yoke adapted to carry a handle, a frame carried by said shaft, said frame comprising a bridge terminating in depending ends, said ends fitting upon said shaft, a knob carried by said bridge, whereby pressure may be imparted to said shaft by means of said frame, and means carried by said yoke and engaging said frame for releasably retaining said frame in a vertical position whereby pressure may be directly imparted to said shaft.

2. A device of the class described comprising a shaft, a yoke carried by said shaft, said shaft adapted to carry a handle, cutting disks rotatably supported upon said shaft, a frame carried by said shaft, said frame comprising a bridge terminating in depending ends, said ends fitting upon said shaft, a spring catch carried by said yoke, said catch adapted to releasably engage said frame, whereby said frame may be releasably retained in a vertical position for allowing pressure to be brought to bear upon said disks by means of said shaft.

3. A device of the class described comprising a shaft, a U-shaped yoke carried by said shaft, said yoke adapted to carry a handle, a frame carried by said shaft, said frame comprising a bridge terminating in depending ends, said ends fitting upon said shaft, one of said ends provided with an opening, said yoke provided with an opening, a spring catch carried by said yoke and releasably engaging said frame, said spring catch comprising a body terminating at one end in a hook and at its opposite end in an angular finger, said hook passing through the opening formed in said yoke, said finger being adapted to pass through the opening formed in said frame whereby said frame may be retained in a vertical position, the end of said hook being adapted to come into engagement with said yoke before said finger is removed from the opening formed in said frame whereby said spring catch will be held against accidental releasement, and said catch being adapted to be swung outwardly for releasing said frame when desired.

4. A device of the class described comprising a shaft, a U-shaped yoke carried by said shaft, said yoke adapted to carry a handle, a frame carried by said shaft, said frame comprising a bridge terminating in depending ends, said ends fitting upon said shaft, a spring catch carried by said yoke and releasably engaging said frame, said spring catch comprising a body terminating at one end in a hook and at its opposite end in an angular finger, said hook engaging said yoke and said finger releasably holding said frame whereby said frame may be retained in a vertical position, the end of said hook being adapted to come into engagement with said yoke before said finger is removed from engagement with said frame, whereby said spring catch will be held against accidental releasement, and said catch being adapted to be swung outwardly for releasing said frame when desired.

In testimony whereof I hereunto affix my signature in presence of two witnesses.

LESTER G. RUDE.

Witnesses:
D. F. GUNNESS,
V. EFFIE FERGUSON.